United States Patent Office 3,365,130
Patented Jan. 23, 1968

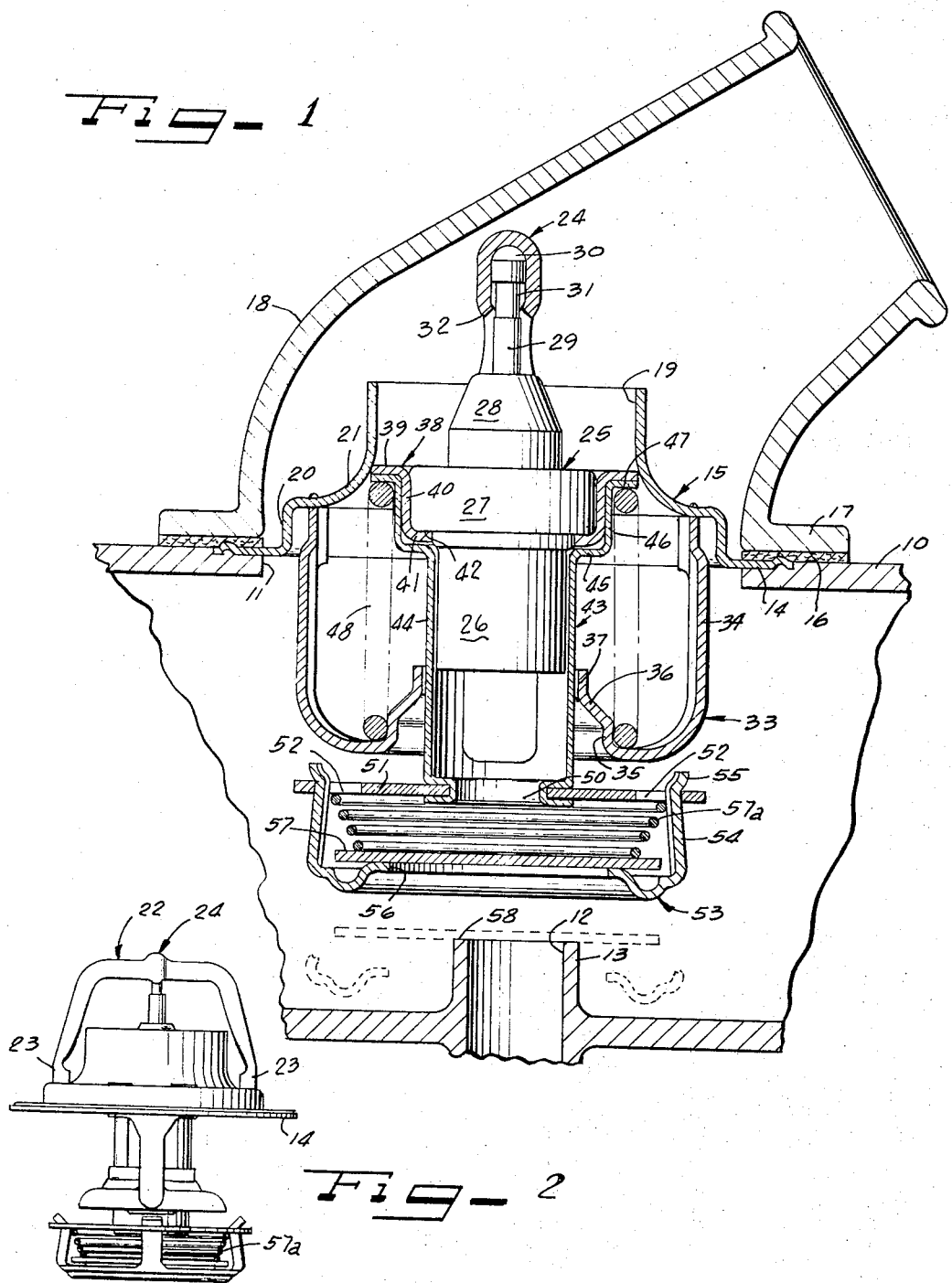

3,365,130
WATERLINE THERMOSTAT
William F. Kamin and Frank E. Obermaier, Park Ridge, Ill., assignors to The Dole Valve Company, Morton Grove, Ill., a corporation of Illinois
Filed Aug. 10, 1965, Ser. No. 478,546
4 Claims. (Cl. 236—34.5)

ABSTRACT OF THE DISCLOSURE

A thermostatic valve to be mounted in an internal combustion engine to control the flow of cooling liquid through two separate ports. The cooling liquid passing through one port provides means for circulating water from the engine block through a by-pass conduit and then back to the engine block when the temperature of the cooling liquid is below a predetermined level and for closing off the flow of cooling liquid through the by-pass port and diverting the cooling liquid through a larger main port and therefrom to the automobile radiator when the temperature of the cooling liquid is greater than the predetermined temperature. The thermostatic valve is provided with a cage for confining a disc which cooperates with one of the ports to control the flow of cooling liquid therethrough. The cage is connected to the main valve by a tubular member.

---

The present invention relates to an improved waterline thermostat and more particularly relates to a waterline thermostat used in controlling the flow of water through the cooling system of an internal combustion engine in which the thermostat is effective to control the flow of liquid through both a main port and an associated by-pass port.

Waterline thermostats have found a considerable use in controlling the flow of water through the radiator and engine of a water cooled internal combustion engine as a function of the temperature of water in or leaving the engine block. For some purposes, well understood by those skilled in the art, it is desirable to provide a means for circulating water from the engine block through a by-pass port and thence through a heater core or the like and back to the engine block when the temperature of the water leaving the engine block is at a predetermined level and for closing off the flow of liquid through the by-pass port and diverting the water traveling from the block through a larger main port and thence through the automobile radiator when the temperature of water leaving the engine block rises above a predetermined point.

At any rate, it is desirable to provide a valve assembly wherein the flow of water from the engine block to and through one or the other of two associated ports can be controlled as a function of the temperature of water leaving the engine block.

The present invention provides a waterline thermostat capable of performing these functions and does so in an efficient and inexpensive manner.

An important object of the present invention resides in the provision of a waterline thermostat which is designed so as to control the flow of water through two opposed ports as a function of the temperature of water ambient the unit.

Another important feature of the invention resides in the provision of a valve assembly which can be assembled very simply and in which the principal components of the device are held together by snap fits and spring bias.

Yet another object of the invention is directed to the provision of a unit of this general type wherein over-travel of the temperature sensitive power unit which serves to drive the assembly can be accommodated even after a valve member carried by the unit has seated.

These and other objects, advantages, and features of the present invention will become apparent from time to time as the following specification proceeds and with reference to the accompanying drawings, wherein:

FIGURE 1 shows a vertical sectional view of a waterline thermostat constructed in accordance with the principles of the present invention seated in an operating position within the conduit of a cooling system of an internal combustion engine; and FIGURE 2 is a side elevational view of the device illustrated in FIGURE 1.

Referring to the drawing, there is shown a main water conduit 10 of the cooling system of an internal combustion engine which has an opening 11 formed in the upper wall thereof and which has a port 12 formed within an upwardly and inwardly extending boss 13, shown here as being formed integrally with the conduit 10.

The outwardly extending annular flange 14 of a transverse wall piece 15 is seated on the conduit 10 around the opening 11 and has a gasket 16 lying thereover which serves to provide a positive fluid seal between the flange 14 and the conduit 10. The flange 17 of a hose fitting 18 is seated on top of the gasket 16 and serves to sandwich the gasket 16 and flange 14 tightly into engagement with the conduit 10 whereby a poistive fluid tight seal is maintained betwen these several parts, the means for matniaining the hose fitting 18 and the other already described associated components in assembled relation is well understood by those skilled in the art and need not here be further defined.

The transverse wall piece 15 has a cylindrical port wall 19 formed therein and is otherwise an imperforate structure. A large diameter cylindrical section 20 of the transverse wall piece 15 leads from the annular flange 14 to a curvilinear throat 21 which, in turn, leads directly into the cylindrical port wall 19.

A stirrup 22 has a pair of legs 23 seated on and staked to the transverse wall piece 15 to provide a socket 24 for receiving the upper outer end of the piston of a thermal sensitive power unit.

The thermal sensitive power unit or thermal element above referred to is identified by the numeral 25 and includes a temperature sensing portion 26, an enlarged diameter collar 27 formed about the upper end of the sensing portion 26, a guide section 28, and a power member or piston 29 which is slidable within the guide 28 and extensible from the guide upon predetermined increases in temperature amibient the sensing portion 26.

Such thermal elements are well understood by those skilled in this art and the parts 26, 27, 28 are commonly referred to as the casing.

It will be observed that the upper end of the piston 29 has a rounded head 30 formed thereon and that this head 30 is received within the complementary socket 24. Just below the rounded head 30 is a recess 31. A pair of ears 32 of the socket 24 are crimped inwardly somewhat into the recess 31 of the piston 29 and serve to assure that the piston will not move retractably relative to the casing and out of the socket 24.

A guide member 33 includes a pair of legs 34 which, like the stirrup legs 23 are staked to the transverse wall piece 15. The guide member 33 has an inwardly upwardly extending cylindrical spring guide wall 35 which leads to a diagonally upwardly and inwardly extending section 36 which, in turn, terminates in a cylindrical guide 37. The guide 37 is positioned in embracing relation to the temperature sensing portion 26 of the thermal element 25 and serves to guide the element for rectilinear movement as the temperature ambient the sensing portion varies.

The main valve member 38 includes an annular valving section 39 which is cooperable with the curvilinear throat 21 to control the flow of coolant through the port 19, a cylindrical section 40 which lies in juxtaposition to the outer wall of the collar 27 and an inturned annular flange 41 which seats on the shoulder 42 provided intermediate the sensing portion 26 and the larger diameter collar 27.

A tubular member 43 constitutes an important part of the present invention. For the moment, suffice it to say that this tubular member includes an elongated cylindrical section 44 which embraces the sensing portion 26 and which extends through the cylindrical guide 37 and below the bracket 33. The upper end of the tubular member 43 leads from the cylindrical section 44 to an annular outwardly extending shoulder 45 and thence to an enlarged diameter cylindrical section 46 and finally to an annular outturned flange 47. The shoulder 45, cylindrical section 46, and flange 47 correspond to and fit closely around flange 41, cylindrical section 40, and outturned flange 39, respectively, of the valve member 38. A compression spring 48 has its lower end seated on the inner surface of the bracket 30 directly around the upturned cylindrical portion 35 of the bracket and has its upper end seated on the outturned flange 47 of the tubular member 43 whereby to maintain the tubular member in engagement with the valve member 38 and the valve member, in turn, in engagement with the shoulder 27 to maintain these several parts in assembled relation with one another without the benefit of any other securement means. The obvious advantage in terms of assembly cost and parts cost is of considerable moment.

The lower end of the tubular member 43 has an opening 50 formed therein and has a horizontally extending plate 51 connected thereto which does not obstruct the opening 50 but which, in turn, has a plurality of openings 52 formed therearound. A cage member 53 includes a plurality of upwardly extending legs 54 which are received within the several apertures 52 and which have outwardly directed fingers 55 formed on the upper outer ends of the legs 54. The distance between the outer surfaces of the opposed legs 54 in their unstressed condition is somewhat greater than the distance between the outer edges of opposed apertures 52 so that the natural resiliency of the fingers 54 serves to maintain the cage member 53 in position on the plate 51. The cage member 53 has an opening 56 formed therein which is somewhat larger in diameter than the outer diameter of the boss 13. A valve disk 57 is carried between the cage member 53 and the plate 51 and is biased toward the seat 58 by a spring 57a and is engageable with the seat 58 defining the port 13 to control the flow of fluid through that port.

It will be observed that when the main valve member 38 is in the closed position shown, the valve disk 57 is unseated and that there is considerable space between the valve disk 57 and the lower end of tubular member 43 and disk 51 whereby to permit the cage unit and tubular member to move downwardly even after the valve member 57 has seated.

The construction of parts provides a unit in which the by-pass port will be closed shortly after the main port has opened and in which over-travel of the thermal element can be accommodated. Significantly, the design is such that an ordinary poppet type waterline thermostat can be adapted to the dual port fluid control type by fitting on several parts which need no welding, brazing or screws and which parts are all maintained in assembled relation by a snap fit and by the main compression spring.

It will be understood that this invention has been used for illustrative purposes only and that various modifications and variations in the invention may be effected without departing from the spirit and scope of the novel concepts thereof.

What we claim is:

1. In a fluid flow passage having openings formed in opposed walls thereof, the improvement of means for controlling the flow of fluid through said openings which comprises:
   a waterline thermostat mounted within one of said openings and having a fluid flow port;
   a thermal sensitive element having a piston fixedly carried by said thermostat and having a sensing portion disposed within the said passage and movable relative to said port in response to variations in temperatures ambient said sensing portion;
   a valve member carried by said sensing portion of said thermal sensitive element and cooperable with said port to control fluid flow therethrough;
   a boss extending inwardly from a wall of said passage opposite said one wall and providing a seat defining the second of said openings;
   a valve head cooperable with said seat to control fluid flow therepast;
   a cage movable over said boss and confining said valve head for limited freedom of movement therein; and
   means interconnecting said thermal sensitive element and said cage.

2. In a fluid flow passage having openings formed in opposed walls thereof, the improvement of means for controlling the flow of fluid through said openings which comprises:
   a waterline thermostat mounted within one of said openings and having a fluid flow port;
   a thermal sensitive element having a piston fixedly carried by said thermostat and having a sensing portion disposed within the said passage and movable relative to said port in response to variations in the temperatures ambient said sensing portion;
   a valve member carried by said sensing portion of said thermal sensitive element and cooperable with said port to control fluid flow therethrough;
   a boss extending inwardly from a wall of said passage opposite said one wall and providing a seat defining the second of said openings;
   a valve disk engageable with said seat to control fluid flow therepast;
   a cage movable over said boss and embracing said valve disk to prevent radial and permit axial movement thereof; and
   means interconnecting said cage and said thermal sensitive element.

3. A thermostatic valve for controlling the flow of fluid through a fluid passage wherein ports are formed through opposed walls of the passage and one of said ports is defined by an inwardly extending raised boss, comprising:
   a transverse wall piece positioned within the port opposite said raised seat port and having a main flow port formed therethrough;
   a stirrup extending across said main flow port and connected to said transverse wall piece;
   a thermal sensitive element positioned within said main flow port and having a casing and having a piston extensible from said casing and carried by said stirrup;
   said casing having a temperature sensing portion whereby increases in temperatures ambient said sensing portion will cause said piston and casing to move extensibly relative to one another;
   a collar formed around said casing intermediate said sensing portion and said piston;
   a valve member fitted over said sensing portion with an inturned annular edge abutting said collar and with an outturned annular flange engageable with the wall of said transverse wall piece defining said main flow port;
   a ported tubular member fitted over said sensing portion and having an enlarged diameter section surrounding said collar and having an outturned flange underlying the outturned flange underlying the outturned flange of said valve member;

a guide member extending from said transverse wall piece within said passage and embracing said tubular member to guide said tubular member and the casing of said thermal sensitive element for rectilinear movement;

a spring interposed between said guide and the said outturned flange of said tubular member and biasing said valve member into engagement with the wall of said transverse wall piece defining said main flow port and maintaining said tubular member, valve member, and thermal sensitive element in assembled relation;

a mounting plate fixed to the outer end of said tubular member and extending laterally therefrom, spaced apertures formed within said plate;

a cage having an opening of greater diameter than the outer diameter of said boss and having fingers formed integrally therewith and extending through said apertures and frictionally engaging said plate whereby to maintain said plate and cage in assembled relation, and a valve disc carried freely within said cage and engageable with said raised boss to control the flow of fluid therethrough, wherein said disc is out of engagement with said raised boss when said main flow port is in a closed condition and wherein opening of said main flow port by movement of the said casing of said thermal sensitive element and the associated valve member away from the transverse wall piece will move the tubular member and cage to a position such that the valve disk will engage the said raised boss, and wherein the movement of said valve disk permitted relative to said cage and plate will accommodate movement of said thermal element relative to said raised seat after closure of the port defined by said raised boss.

4. A thermostatic valve as defined in claim 3 wherein an opening is formed in the outer end of said tube to provide access to the base end of said thermal sensitive element along the center axis thereof.

References Cited

UNITED STATES PATENTS

| 1,499,834 | 7/1924 | Lux | 236—102 |
| 2,379,109 | 6/1945 | Shaw | 236—34.5 |
| 2,400,911 | 5/1946 | Booth | 236—34.5 |
| 2,425,439 | 8/1947 | Puster | 236—34.5 |
| 2,439,336 | 4/1948 | Dillman | 236—100 |
| 2,886,063 | 5/1959 | Ray | 137—625.5 |
| 3,172,602 | 3/1965 | Drapeau | 236—34.5 |

FOREIGN PATENTS 1,035,408    7/1958    Germany.

EDWARD J. MICHAEL, *Primary Examiner.*